(12) United States Patent
Robinson

(10) Patent No.: US 9,075,126 B2
(45) Date of Patent: Jul. 7, 2015

(54) GROUND LOCATION INERTIAL NAVIGATION GEOPOSITIONING SYSTEM (GROUNDLINGS)

(75) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 401 days.

(21) Appl. No.: 13/536,809

(22) Filed: Jun. 28, 2012

(65) Prior Publication Data
US 2014/0002302 A1    Jan. 2, 2014

(51) Int. Cl.
| G01S 19/38 | (2010.01) |
| G01S 5/12 | (2006.01) |
| G01S 19/02 | (2010.01) |
| G01S 11/08 | (2006.01) |
| H04B 7/185 | (2006.01) |

(52) U.S. Cl.
CPC . *G01S 5/12* (2013.01); *G01S 19/02* (2013.01); *G01S 11/08* (2013.01); *H04B 7/1855* (2013.01)

(58) Field of Classification Search
CPC ........ G01S 19/38; G01S 19/39; G01S 19/07; G01S 19/11; G01S 19/26; G01S 5/10
USPC ............ 342/357.21, 357.22, 357.44, 357.48, 342/357.65, 357.78
See application file for complete search history.

(56) References Cited

U.S. PATENT DOCUMENTS

| | | | |
|---|---|---|---|
| 3,860,921 A | 1/1975 | Fletcher et al. | |
| 5,570,096 A | 10/1996 | Knight | |
| 5,760,738 A * | 6/1998 | Kawano | 342/357.48 |
| 5,955,986 A | 9/1999 | Sullivan | |
| 5,995,040 A | 11/1999 | Issler et al. | |
| 6,020,847 A | 2/2000 | Upton et al. | |
| 6,031,489 A * | 2/2000 | Wyrwas et al. | 342/357.2 |
| 6,107,959 A | 8/2000 | Levanon | |
| 6,147,644 A | 11/2000 | Castles et al. | |
| 6,229,477 B1 | 5/2001 | Chang et al. | |
| 6,307,503 B1 | 10/2001 | Liu | |
| 6,476,758 B1 | 11/2002 | Chaput et al. | |

(Continued)

FOREIGN PATENT DOCUMENTS

| EP | 0844492 A1 | 5/1998 |
| EP | 0856957 A2 | 8/1998 |

(Continued)

OTHER PUBLICATIONS

Vetter; Fifty Years of Orbit Determination: Development of Modern Astrodynamics Methods; Johns Hopkins Apl Technical Digest; 2007; pp. 239-252; vol. 27, No. 3.

(Continued)

*Primary Examiner* — Harry Liu

(57) ABSTRACT

A ground location inertial navigation geopositioning system (GROUNDLINGS) end receiver (GER) can include a GROUNDLINGS module. The GROUNDLINGS module can be configured to generate a GER position using a time of flight (TOF) of a downlink pseudo-random noise (PRN) signal and a Doppler shift of at least one of the downlink PRN signal and a downlink tone signal on a common frequency carrier. The downlink PRN signal sent from a GROUNDLINGS satellite (GRS) to the GER can include a copy of an uplink PRN signal from a ground located transceiver (GLT) to the GRS. When used, the downlink tone signal can be received from the GRS.

20 Claims, 10 Drawing Sheets

(56) References Cited

U.S. PATENT DOCUMENTS

| | | |
|---|---|---|
| 6,864,838 B2 | 3/2005 | Harles et al. |
| 7,372,400 B2 | 5/2008 | Cohen et al. |
| 7,512,505 B2 | 3/2009 | Harles |
| 8,019,541 B2 | 9/2011 | Cohen et al. |
| 8,451,166 B2 | 5/2013 | Gayrard et al. |
| 8,711,033 B2 | 4/2014 | Calmettes et al. |
| 2011/0144911 A1* | 6/2011 | Madhavan et al. ............ 701/214 |
| 2011/0254730 A1* | 10/2011 | McBurney ................. 342/357.4 |

FOREIGN PATENT DOCUMENTS

| | | |
|---|---|---|
| WO | WO 99/40692 | 8/1999 |
| WO | WO 0052495 | 9/2000 |
| WO | WO 2011/075707 A1 | 6/2011 |

OTHER PUBLICATIONS

Jayles et al; Ten Centimeters Orbits in Real-Time On-Board of a Satellite: DORIS-DIODE Current Status; Acta Astronautica; 2004; pp. 315-323; vol. 54.

Brunet et al; Doris Precise Orbit Determination and Localization System Description and USO's Performances; 1995 IEEE International Frequency Control Symposium; pp. 122-132.

McCaskill et al; Doppler Only Navigation Using the Timation II Satellite [Unclassified Title], NRL Report 7657; Dec. 3, 1973; 32 pages.

Boehme; Miniature Analog GOS Translator for Trident Reentry Body Accuracy Analysis; Johns Hopkins APL Technical Digest; 2010; pp. 133-140; vol. 29, No. 2.

Levesque et al; Performance Issues Concerning Doppler-Only Localization of Submarine Targets; Saclantcen Report, serial No. SR-325; Jul. 2000; 49 pages.

Lemoine et al; Three Decades of Precision Orbit Determination and its Vital Role to Oceanography; Jun. 19, 2008; 23 pages.

Stewart; Evolution of Military GPS; 21 pages; (the inventor believes that this was publicly available sufficiently earlier than the effective US filed and any foreign priority date).

U.S. Appl. No. 13/463,566; Ian Robinson; filed May 3, 2012.

U.S. Appl. No. 13/463,522; Ian Robinson; filed May 3, 2012.

PCT/US2013/028715; filed Mar. 1, 2013; Raytheon Company; International Search Report dated Jun. 7, 2013.

PCT/US2013/038503; filed Apr. 26, 2013; Raytheon Company; international search report dated Nov. 28, 2013.

PCT/US2013/028709; filed Mar. 1, 2013; Raytheon Company; international search report dated Dec. 18, 2013.

Anonymous; Doris; https://noppa.aalto.fi/noppa/kurssi/maa-6.3272/luennot/maa-6_3272_doris.pdf ; Upon information and belief, available prior to May 3, 2012; 4 pages.

U.S. Appl. No. 13/463,566, filed May 3, 2012; Ian S. Robinson; office action dated Oct. 1, 2014.

U.S. Appl. No. 13/463,566, filed May 3, 2012; Ian S. Robinson; Notice of Allowance mailed Dec. 24, 2014.

U.S. Appl. No. 13/463,522, filed May 3, 2012; Ian S. Robinson; office action dated Apr. 23, 2015.

* cited by examiner

GROUND LOCATION INERTIAL NAVIGATION GEOPOSITIONING SYSTEM (GROUNDLINGS)

BACKGROUND

Satellite navigation systems, such as a global positioning system (GPS), enable a receiver to determine a location from ranging signals received from a plurality of satellites. The GPS can include three major segments: a space segment (SS), a control segment (CS), and a user segment (US). The United States Air Force develops, maintains, and operates the space and control segments. GPS satellites broadcast signals from space, and each GPS receiver uses these signals to calculate a three-dimensional location (latitude, longitude, and altitude) of the GPS receiver and a current time at each GPS satellite. The space segment can include 24 to 32 satellites in a medium Earth orbit (MEO). The control segment can include a master control station, an alternate master control station, and a host of dedicated and shared ground antennas and monitor stations. The user segment can include military, civil, commercial, and scientific users.

SUMMARY OF EXEMPLARY EMBODIMENTS

A ground location inertial navigation geopositioning system (GROUNDLINGS) can be used to provide a timely backup or restoration to GPS capability and functionality in a case when the GPS system is disabled or disrupted, or when insufficient GPS satellites are in view of a GPS receiver. In an example, GROUNDLINGS can provide users with adequate position and/or navigation information when a GPS receiver is jammed, spoofed, or insufficient GPS satellites are in view of the GPS receiver.

GROUNDLINGS can include a ground located transceiver (GLT), a GROUNDLINGS satellite (GRS), and a GROUNDLINGS end receiver (GER). The GLT can transmit at least one uplink pseudo-random noise (PRN) signal and at least one uplink tone signal to a GRS in an uplink transmission. In an example, the GLT can sequentially transmit a first uplink PRN signal and a first tone PRN signal to a GRS on a first frequency carrier (e.g., a common frequency carrier), and sequentially transmit a second uplink PRN signal and a second uplink tone signal to a GRS on a second frequency carrier. The PRN signal (e.g., the uplink PRN signal and a downlink PRN signal) can include a time at the GLT, a GLT location, and ephemeris information of a plurality of GRS.

In an example, the GRS can receive the uplink transmission, may delay the transmission when a same frequency carrier is used for the uplink (UL) and downlink (DL) transmission (e.g., time-division duplexing (TDD) or time-division multiplexing (TDM)), then retransmit a copy of the uplink transmission (e.g., the uplink PRN signal and the uplink tone signal) as a downlink transmission (e.g., the downlink PRN signal and the downlink tone signal). As used herein, a copy of the uplink transmission can refer to a relayed copied on a same frequency carrier using TDD or a transponded copy on a different frequency carrier using frequency-division duplexing (FDD). The delay may be used to avoid collisions in transmitting a downlink signal and receiving an uplink signal at the GRS. In an example, the uplink signal or the downlink signal may be amplified by the GRS before the downlink transmission.

The downlink signal can be received by the GLT or the GER. At the GLT, the GLT can compute an ionospheric corrected Doppler shift of the downlink signal to correct for any delays to ionosphere when at least two downlink signals on different frequency carriers are used. The GLT can calculate a range using the GLT location and a time of flight (TOF) of the combined uplink and downlink PRN signal. The GLT can update the ephemeris information of the GRS using the corrected Doppler shift and the range. The updated ephemeris information can be encoded in subsequent uplink PRN signals.

At the GER, the GER can include a GROUNDLINGS module configured to generate a GER position using a TOF of the combined uplink and downlink PRN signal and the Doppler shift of at least one of the downlink PRN signal and a downlink tone signal on a common frequency carrier. The GER can decode the downlink PRN signal. The downlink PRN signal sent from the GRS to the GER can include a copy of an uplink PRN signal from the GLT to the GRS. The GER can extract from the PRN signal the time at the GLT, a GLT location, or ephemeris information of the GRS. In an example, the GROUNDLINGS module can generate the GER position using the TOF of the combined uplink and downlink PRN signal and the Doppler shift of the downlink tone signal. In another example, the GROUNDLINGS module can include a Doppler shift module, a range estimator, and a receiver location estimator. The Doppler shift module can be configured to measure a Doppler shift in at least one of the downlink PRN signal and the downlink tone signal. The range estimator can be configured to calculate a GLT range from the GLT to the GRS using GRS ephemeris information and a GLT location included in the downlink PRN signal. The range estimator can also be configured to calculate a super-range measurement from the timing of the combined uplink and downlink PRN signal. The super-range measurement can represent a distance from the GLT to the GER via the GRS. The receiver location estimator can be configured to estimate a GER position using the ephemeris of the GRS, the position of the GLT, from which the portion of the super-range that is the GLT to the GRS is computed, the super-range measurement, and the measured the Doppler shift in at least one of the downlink PRN signal and the downlink tone signal. The receiver location estimator can determine an initial GER position from a GER range from the GRS to the GER and from a Doppler shift magnitude and a Doppler trend over time of at least one of the downlink PRN signal and the downlink tone signal. In an example, the receiver location estimator can trend a range in a plurality of the downlink PRN signals. The receiver location estimator can also trend a Doppler shift in a plurality of the downlink PRN signals or downlink tone signals to generate the GER position. In another example, the uplink and downlink can use only PRN signals. The GER can compute the Doppler shift of each PRN signal as well as decode the signal to determine TOF, GRS ephemeris, GLT location, and any other encoded information. In another example, the receiver location estimator can include an altimeter, a barometer sensor, or an altitude sensor for determining an altitude of the GER. The receiver location estimator can include an inertial measurement unit (IMU), an inertial navigation system (INS), a motion sensor, a velocity sensor, an accelerometer, a magnetometer, a barometer, a rotation sensor, a gyroscope, a wheel counter, an odometer, or a pedometer for determining movement of the GER.

In another configuration, the GROUNDLINGS module can receive a second downlink PRN signal on a second frequency carrier and correct for ionospheric errors in the GER position using the downlink PRN signal and second downlink PRN signal. In another example, the GROUNDLINGS module can be configured to reset the clock bias by comparing the GLT range generated from the ephemeris of the GRS and the location of the GLT and the GLT range generated from the super-range or the Doppler shift in at least one of the downlink PRN signal and the downlink tone signal.

In another configuration, a method can be used for global positioning using a GER. The method can include the operation of generating a global position using a TOF of a downlink PRN signal and a Doppler shift of at least one of the downlink PRN signal and a downlink tone signal on a common frequency carrier. A computer program product can also be provided, which computer program product can comprise a non-transitory computer readable storage medium having a computer readable program code embodied therein, the computer readable program code being adapted to be executed to implement the method discussed above.

In another example, GROUNDLINGS can use other transmission stations (e.g., a known transmitter (KT)) with a standard broadcast signal to generate a global position of a GER. GROUNDLINGS can include a known transmitter (KT), a GROUNDLINGS satellite (GRS), and a GROUNDLINGS end receiver (GER). In an example, the KT can be owned or operated by an entity not associated with the GRS or GER. The KT can transmit a broadcast signal (e.g., for another purpose). The GRS can receive the broadcast signal in an uplink transmission and transpond on a different frequency the same waveform as the broadcast signal in a downlink transmission to the GER. The GER can receive the original signal from the KT and a copy of the broadcast signal relayed through the GRS. The GER can include a GROUNDLINGS module configured to generate a global position using a TOF computed by correlating the broadcast signal from the KT and the transponded version and a Doppler shift of a copy of the broadcast signal relayed through the GRS. The GROUNDLINGS module can include a Doppler shift module, a range estimator, and a receiver location estimator. In an example, the GROUNDLINGS module can also include a KT module and a GRS ephemeris module. The KT module can be configured to store a KT location and at least one modulation frequency transmitted by the KT. The GRS ephemeris module configured to store ephemeris information from at least one GRS. The KT module and the GRS ephemeris can be configured to update information from a GRS signal or a ground station signal. The GRS signal can be transmitted by the GRS and can include a KT location, a modulation frequency transmitted by the KT, or GRS ephemeris information. The ground station signal can be transmitted by a ground station (e.g., the GLT or other transmission station) and can include a KT location, a modulation frequency transmitted by the KT, or GRS ephemeris information.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
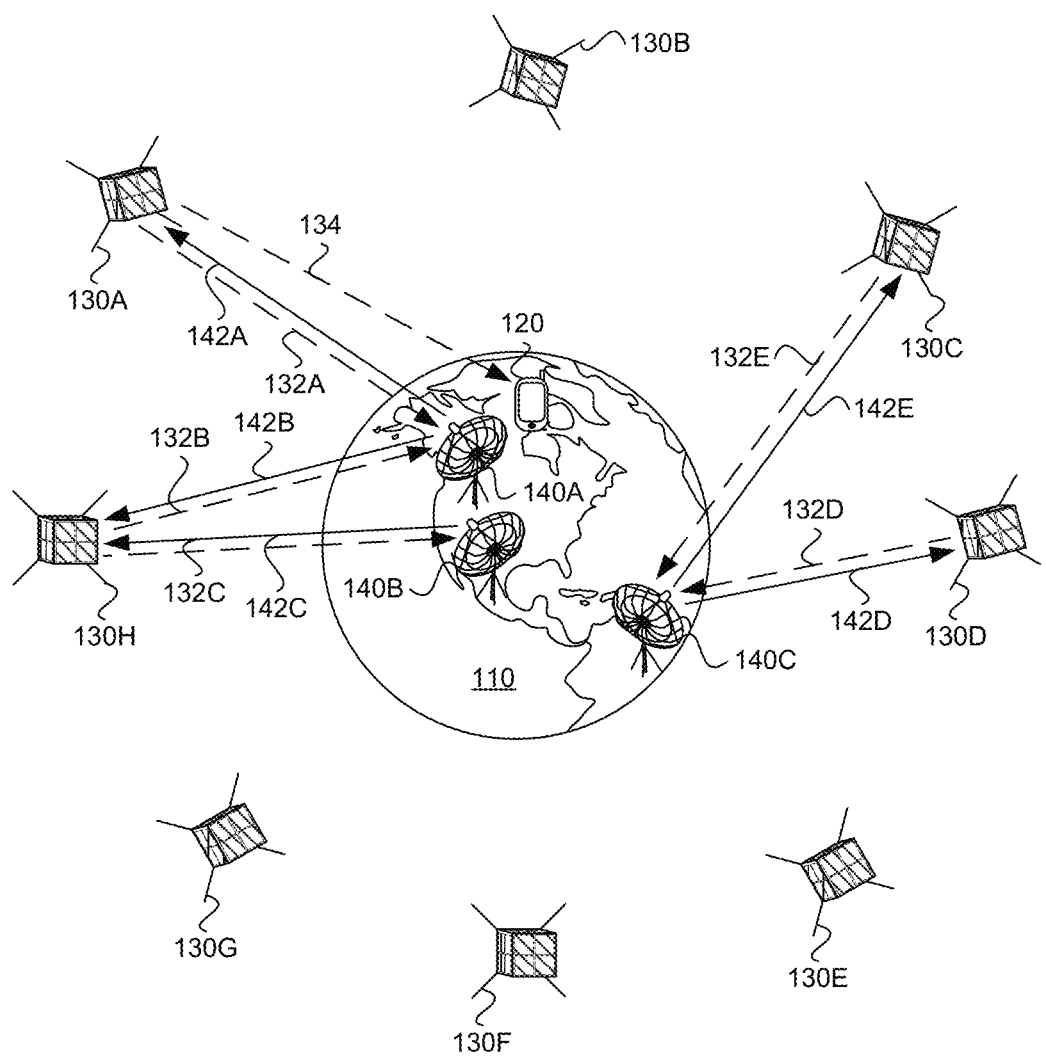
FIG. 1 illustrates a diagram of a plurality of ground located transceivers (GLT), a plurality of ground location inertial navigation geopositioning system (GROUNDLINGS) satellites (GRS), and a GROUNDLINGS end receiver (GER) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The global positioning system (GPS) is a space-based global navigation satellite system (GNSS) that can provide location and time information in various types of weather, anywhere on or near the Earth, where a GPS receiver has an unobstructed line of sight to four or more GPS satellites. The GPS ranging signals can be broadcasted on frequencies, such as the L1 signal (1.57542 gigahertz (GHz)) and/or L2 signal (1.2276 GHz). Position can be determined from matching codes in the transmitted signal and the receiver to determine the difference in time between transmission and reception. A code division multiple access (CDMA) code is transmitted by the GPS satellites to the receiver and correlated with replica codes to determine ranges to different satellites, which can be used to determine the position of a GPS receiver on or near the Earth. Generally, a GPS receiver receives signals from multiple GPS satellites (e.g., four) to find its position.

When a GPS satellite is blocked from the GPS receiver so too few GPS satellites are in view of the GPS receiver, the GPS receiver can provide no positioning information or it can generate inaccurate or incorrect positioning information. Alternatively, the GPS signal on known GPS frequencies may be jammed by an external jamming source or other electronic equipment preventing the GPS receiver from receiving a valid GPS signal. Alternatively, an external spoofing source may generate a false GPS signal on known GPS frequencies in an attempt to spoof the GPS receiver to generate inaccurate or incorrect positioning information.

A ground location inertial navigation geopositioning system (GROUNDLINGS) can be used to provide a timely backup or restoration to GPS capability and functionality in a case when the GPS system is lost, disabled, disrupted, or when insufficient GPS satellites are in view of a GPS receiver. In an example, GROUNDLINGS can provide users with adequate position and/or navigation information when a GPS receiver is jammed, spoofed, or insufficient GPS satellites are in view of the GPS receiver. GROUNDLINGS can be independent of the GPS three dimensional (3-D) positioning. In another example, the GROUNDLINGS can augment GPS (e.g., in urban environment where obtaining a line of sight (LOS) to at least 4 GPS satellites can be difficult from time to time.

FIG. 1 illustrates a segment of GROUNDLINGS, which can be used to provide GPS-type position accuracy to an end receiver 120 using signals originating from a ground located transceiver (GLT) 140A-C and relayed through a GROUNDLINGS satellite (GRS) 130A-H. The uplink signals can be transmitted 142A-E from GLT to the GRS, where the uplink signals can be copied by the GRS and retransmitted as downlink signals 134 over a wide area from the GRS to the GROUNDLINGS end receiver (GER) 120. In an example, the GRS may have a line of sight (LOS) to one GLT and the GER may have a LOS to one GRS. The GER and/or the GLT can be on or near the Earth 110. The GER can generate a GER position using a time of flight (TOF) and a Doppler shift of the downlink signal on a common frequency carrier. In an example, the downlink signal (D1) can include a downlink pseudo-random noise (PRN) signal (DP1) and a downlink tone signal (DT1) corresponding to an uplink PRN signal (UP1) and an uplink tone signal (UT1) of an uplink signal (U1), respectively. A CDMA code may be carried by the PRN signal. A second downlink signal can also be transmitted on a different frequency carrier (e.g., a second frequency carrier) from the common frequency carrier (e.g., a first frequency carrier) used by the downlink signal transmission (e.g., a first downlink signal transmission). Downlink transmissions on at least two frequency carriers can be used to correct time delays or Doppler shift due signal transmission in an ionosphere. The second downlink signal (D2) can include a second downlink PRN signal (DP2) and a second downlink tone signal (DT2) corresponding to a second uplink PRN signal (UP2) and a second uplink tone signal (UT2) of a second uplink signal (U2), respectively. The downlink signals 132A-E (e.g., the first downlink signal and the second downlink signal) can also be transmitted from the GRS back to the GLT. In an example, the uplink signal and downlink signal can include a PRN signal. In another example, the uplink signal and downlink signal can include both a PRN signal and a tone signal.

The downlink signal 132A-E and 134 can be a repeated signal a transponded signal, or an augmented signal. A repeated signal can be a copy of the original signal repeated from the different location. A transponded signal can be frequency shifted copy of an original signal transponded from a different location. An augmented signal can be a repeated signal or a transponded signal with additional information added by a relay (e.g., GRS). In an example, the first uplink signal can be repeated in a first downlink signal on a same common frequency carrier (or carrier frequency). In another example, the first uplink signal transmitted on a first uplink frequency carrier can be transponded in a first downlink signal on a first downlink frequency carrier different from the first uplink frequency carrier, and the second uplink signal transmitted on a second uplink frequency carrier can be transponded in a second downlink signal on a second downlink frequency carrier different from the second uplink frequency carrier. The first uplink frequency carrier, the first downlink frequency carrier, the second uplink frequency carrier, and the second downlink frequency carrier can use a different frequency carrier from each other. In another example, the uplink signal can include PRN signal generated by the GLT and the downlink signal can be augmented with a tone signal generated by the GRS, so the downlink signal includes both the PRN signal and the tone signal. The tone signal can be a sinusoidal wave or other periodic wave form.

When a repeated signal is used in the downlink transmission, a delay may be applied at the GRS to separate the downlink transmissions from the uplink transmissions to allow for time-division duplexing (TDD). TDD is an application of time-division multiplexing (TDM) to separate transmission signals and received signals on a same carrier frequency. In TDD, the transmission signals and the received signals (e.g., the transmitted signals and the transponded signals) may be carried on the same frequency carrier (or carrier frequency) where the transmission signals use a different time interval from the received signals, so the transmission signals and the received signals do not generate interference for each other. TDM is a type of digital multiplexing in which two or more bit streams or signals, such as transmission signals and received signals, are transferred sequentially as sub-channels in one communication channel, and physically taking turns on the channel. When a transponded signal is used in the downlink transmission, the GRS may use a frequency shifter to shift the downlink transmission to a different frequency carrier from the uplink transmission using frequency-division duplexing (FDD). In FDD, a transmitter and a receiver can operate using different frequency carriers (or carrier frequencies). In FDD, interference can be avoided because the transmission signals use a different carrier frequency from the received signals.

As illustrated in FIG. 1, GROUNDLINGS can include a constellation of low Earth orbit (LEO) satellites (or a plurality of GRS 130A-H) to provide downlink signals that the GER 120 can use to determine a three dimensional (3-D) position of the GER. LEO can generally be defined as an orbit within the locus extending from the Earth's surface 110 up to an altitude of approximately 2,000 kilometers (km). The GRS can comprise a LEO satellite. For illustration, a GPS can operate with a constellation of 24 GPS satellites. The GPS satellites can be medium Earth orbit (MEO) satellites. MEO, also known as an intermediate circular orbit (ICO), can be a region of space around the Earth above the LEO (altitude of approximately 2,000 km or 1,243 miles (mi)) and below geostationary orbit (altitude of 35,786 km or 22,236 mi). The geostationary orbit, also known as the geostationary Earth orbit (GEO), can have a period equal to the Earth's rotational period and an orbital eccentricity of approximately zero. An object in the GEO can appear motionless, at a fixed position in the sky, relative to ground observers. In an example, the GRS may be in an orbit between a GPS satellite and a surface of the Earth.

The number of GRS 130A-H in the GRS constellation may be greater than the number of GPS satellites in the GPS constellation to provide global coverage or near global coverage. For example, 66 GRS in the GRS constellation can provide global coverage from 800 km. Fewer GRS can be used for non-polar coverage or if gaps can be tolerated. Each GRS can operate independently of other GRS.

In an example, the GROUNDLINGS can include a ground network of interconnected GLT 140A-C. The GLT can transmit information between each other, such as updated ephemeris information of a plurality of GRS 130A-H in GROUNDLINGS, so each GLT can have updated information of the GLT in the system. In an example, the interconnected GLT can operate using a master clock. In another example, each GLT can be independent and can update the ephemeris information of the GRS when the GRS passes by the GLT. When the GRS are in an orbit approximately 500 km from the Earth's surface, the GLT can be spaced approximately 1000 km apart to provide continuous coverage. In an example, each GLT 140C can communicate 132D-E and 142D-E simultaneously with a plurality GRS 130C-D. In another example, each GRS 130H can communicate 132B-C and 142B-C simultaneously with a plurality GLT 140A-B. In another example (not shown), the GER can receive and process downlink signals simultaneously from a plurality of GRS. Using the GRS in LEO instead of a GRS in MEO can reduce the power consumed to transmit the downlink signals by placing the GRS closer to the GER and generating a stronger downlink signal reception at the GER. The GRS can have a much lower cost, simpler design, and fewer components than a GPS. For example, a GRS may be configured so as to not include an atomic clock.

Given the close range of the GRS in LEO to the GDER, the signal strength for the downlink signals can be less than 10 watts (W), in an example. In an example, the transmission of the downlink signal can be transmitted as a quasi-continuous wave (quasi-CW). In another example, the transmission of the downlink signal can be transmitted intermittently at regular intervals to save power at the GRS. In another example, the GRS can be a satellite with a stable orbit within the LEO or MEO.

Although not to be limiting in any way, in some exemplary embodiments the GRS 130A-H in the GROUNDLINGS can be a CUBESAT or other similar type of small or inexpensive type satellite, such as a picosatellite or a nanosatellite. The CUBESAT can be a type of miniaturized satellite that can have a volume of approximately a liter (10 centimeter (cm) cube) with a weight less than 2 kilograms (kg). The CUBESAT can use commercial off-the-shelf electronics components. The picosatellite (or picosat) can refer to an artificial satellite with a wet mass between 0.1 and 1 kg (0.22 and 2.2 lb). The nanosatellite (or nanosat) can refer to an artificial satellite with a wet mass between 1 and 10 kilograms (kg) (2.2 and 22 pounds (lb)). A microsatellite (or microsat) can refer to an artificial satellite with a wet mass between 10 and 100 kg (22 and 220 lb). These satellites (e.g., the GRS) can include various components capable of providing various functions, such a power source or a power generation mechanism, a mechanism to control heating and cooling of the satellite, and/or a mechanism to point a transmitter or antenna to the Earth. The power generation mechanism can include solar cells or panels. The power source can include a battery or capacitive device. The mechanism to control the heating and cooling of the satellite may control the heating and cooling of the satellite passively, so the mechanism does not require a power source to function properly. The mechanism to point the transmitter or antenna to the Earth may steer or rotate the position of the satellite passively. Those skilled in the art will recognize that these several descriptions are merely exemplary, and are not intended to be limiting in any way.

Figure 2:
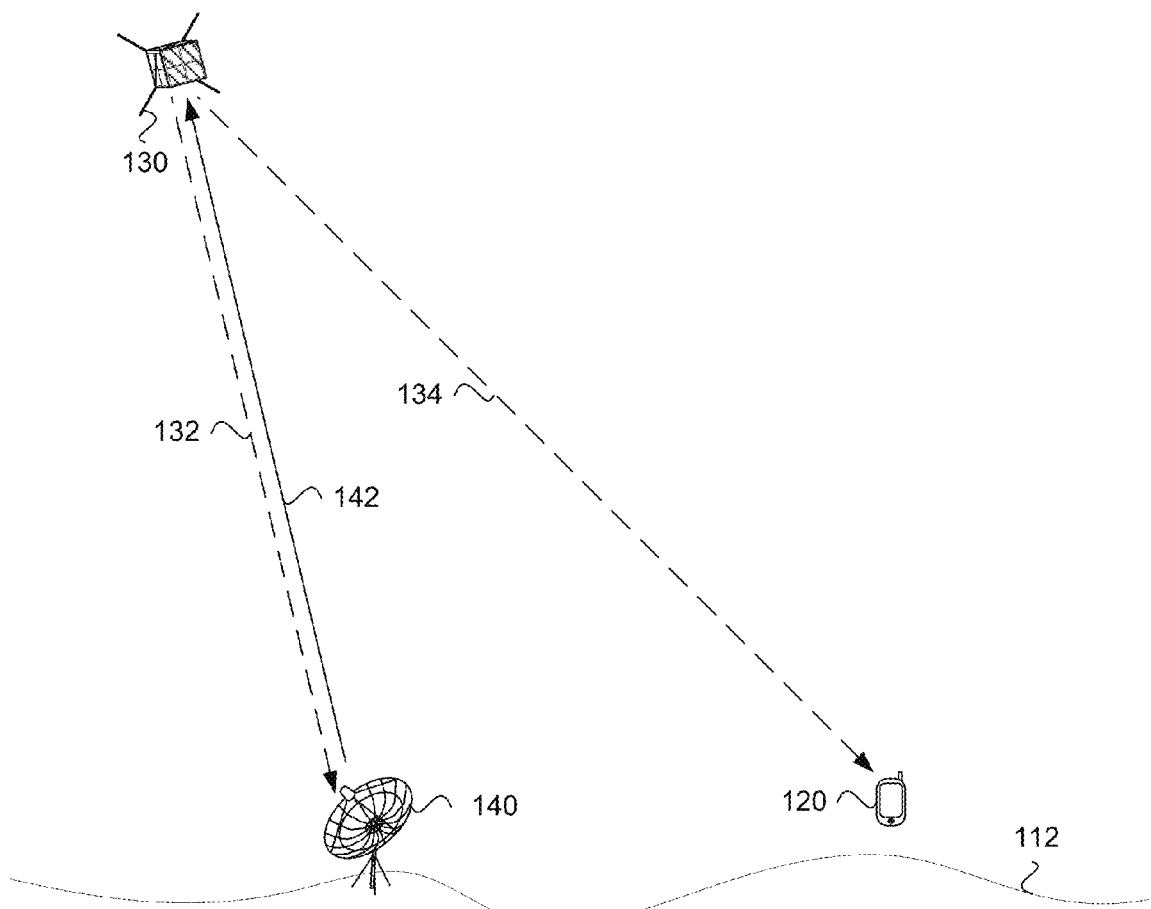
FIG. 2 illustrates a diagram of a ground located transceiver (GLT), a ground location inertial navigation geopositioning system (GROUNDLINGS) satellite (GRS), and a GROUNDLINGS end receiver (GER) in accordance with an example.

FIG. 2 illustrates a diagram of another segment of GROUNDLINGS. GROUNDLINGS can include a ground located transceiver (GLT) 140, a GROUNDLINGS satellite (GRS) 130, and a GROUNDLINGS end receiver (GER) 120. The GLT can transmit uplink signals 142 to the GRS. Each GLT can receive downlink signals 132 and measure a time of flight (TOF) and a Doppler shift to estimate and update the ephemeris of each GRS. A range can be generated from the TOF of the downlink signals. The GLT can transmit the updated ephemeris information in subsequent uplink signals.

The GER 120 can measure a trend in a Doppler shift of the downlink link signal 134 (e.g., the downlink tone signal) and measure a TOF from the GLT 140 to the GER via the GRS 130 (e.g., a GLT-to-GRS-to-GER range or a super-range). The Doppler shift trend of the downlink signal and super range can be combined with a decoded GLT location and GRS ephemeris information within a downlink PRN signal, from which the GER can compute a trend of range values from the GRS to the GER, to locate the GER in a 3-D position. The GER or the GLT can be located on or near the surface 112 of the Earth. The GER can measure the time difference between the generation of the uplink PRN signal by a GLT and the reception of the downlink PRN signal to generate a super-range measurement representing the distance from the GLT to the GER via the GRS (e.g., a GPS-to-GRS-to-GER range). A super-range measurement can include two legs of a "bent pipe" that can include a GLT-to-GRS range, represented by a time of flight (TOF) of the uplink PRN signal 132, and a GRS-to-GER range, represented by the TOF of the downlink PRN signal 134. The uplink PRN signal and the downlink PRN signal can encode the position or location of the GLT and/or the ephemeris information of the GRS. The GER can receive the downlink PRN signal and determine the time elapsed between the signal origin and the receiver's time. The GLT-to-GRS range can be determined by the difference between the known location of the GLT and the known position of the GRS, which can be determined from the GRS ephemeris information. The GRS-to-GER range can be determined by subtracting the GLT-to-GRS range from the super-range measurement, allowing for the delay in the signal at the GRS, which can be known by the GER.

The ephemeris or ephemeris information can include a table various information, such as the positions or orbits of a heavenly body (e.g., a satellite) on a number of dates and times in a regular sequence. Satellites (e.g., the GRS) can be described by their motions in three dimensions (e.g, their orbital elements, ephemerides, or ephemeris information). The ephemeris can include a set of elements (e.g., six or fewer enscripters) that can describe to a very high fidelity what the satellite's location is going to be and what the satellite's motion or orbit is going to be at any given time. An orbit can be a very specific type of circular motion that can be predicted until some outside force acts on the satellite. The ephemeris information may be updated to account for unforeseen forces on the satellite (e.g., GRS), such as atmospheric drag or the gravitation pull by the sun or moon.

The GER can also generate positional information of the GER location relative to the GRS by measuring a Doppler shift of the downlink signal, either a downlink tone signal or a downlink PRN signal. Measuring the Doppler shift of the downlink tone signal can be more straight forward than measuring the downlink PRN signal, but measuring the Doppler shift of the downlink PRN signal can be performed with additional processing. In a FDD example, the downlink signal can include a Doppler shift of the GLT-to-GRS path on the uplink signal and a Doppler shift of the GRS-to-GER path on the downlink signal (e.g., a double Doppler shift). Additional processing may be used in the FDD example to account for the two different frequency carriers (e.g., the uplink frequency carrier and the downlink frequency carrier). Measuring a trend in Doppler shift of the downlink signal can allow the GER to determine the location of the GER with greater accuracy over time. The GRS-to-GER range or the Doppler shift may have some error if a timing offset between a time on a GLT clock and a GER clock occurs.

For illustration, a GEO satellite can have a velocity of approximately 3 km/second (sec) to match the velocity of the Earth with an apparent velocity of approximately 0 km/sec. The apparent velocity can be an object's velocity, such as a satellite (e.g., GRS), relative to another object, such as the GLT or the GER at a fixed point on the Earth. A GRS in the LEO (or other LEO satellite) can have an orbit with a velocity of an approximately 7 km/sec or an apparent velocity of approximately 6.5-7.5 km/sec relative to the fixed point on the Earth. Measuring the speed of the GRS using the Doppler shift of an uplink signal transmitted by the GLT and downlink signal transmitted by the GRS can be used to generate global positioning of the GER.

A Doppler shift can be a change in a frequency (or a change in a wavelength) of a wave for an observer, such as a receiver, moving relative to the source of the wave, such as a transmitter on a satellite. The motion of the observer, the source, or both can generate a change of the measured frequency. The relative changes in frequency due to the Doppler effect can be explained as follows. When the source of the waves is moving toward the observer, each successive wave crest is emitted from a position closer to the observer than the previous wave. Therefore, each wave takes slightly less time to reach the observer than the previous wave. Thus, the time between the arrival of successive wave crests at the observer is reduced, causing an increase in the frequency. While the waves are traveling, the distance between successive wave fronts is reduced, so the waves "bunch together". Conversely, if the source of waves is moving away from the observer, each wave is emitted from a position farther from the observer than the previous wave, so the arrival time between successive waves is increased, reducing the frequency. The distance between successive wave fronts is increased, so the waves "spread out".

The Doppler shift can be proportional to the carrier frequency (e.g., frequency carrier). Higher frequencies can provide more accuracy in Doppler measurements than lower frequencies but generating higher frequencies can consume more power in the satellite (e.g., GRS) than lower frequencies. Objects moving at greater velocities relative to each other can provide more accuracy in Doppler measurements than objects moving at slower velocities relative to each other. Objects at closer distances to each other can provide more accuracy in Doppler measurements than objects at farther distances to each other. The satellite operating in LEO can impose a greater amount of Doppler shift on the uplink and downlink signals than a satellite operating in MEO, which can have a slower apparent velocity. The Doppler shift of a downlink signal from the GRS at a known position to an unknown point, such as the GER can uniquely determine the location of the GER based on orbital parameters of the GRS.

Figure 3:
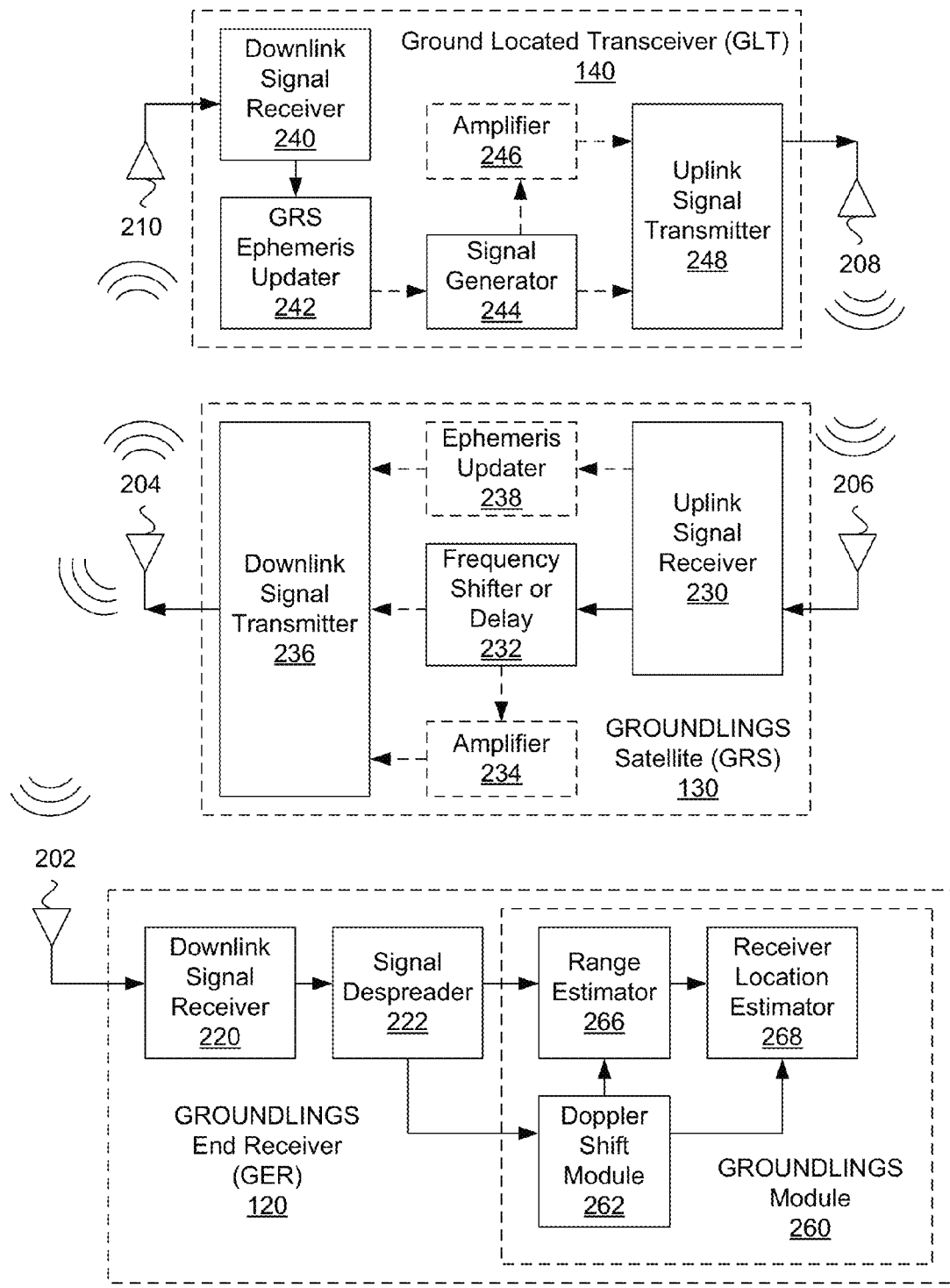
FIG. 3 illustrates a block diagram of a ground located transceiver (GLT), a ground location inertial navigation geopositioning system (GROUNDLINGS) satellite (GRS), and a GROUNDLINGS end receiver (GER) in accordance with an example.

FIG. 3 can provide additional details of GROUNDLINGS. In an example, the ground located transceiver (GLT) 140 can include a signal generator 244, an uplink signal transmitter 248, and at least one uplink transmitting antenna 208. The GLT can also include a precise clock, like an atomic clock used for PRN signal generation. On a transmission side of the GLT, the signal generator can generate the uplink signals (e.g., the first and second uplink PRN signal and/or the first and second uplink tone signal) on specified frequency carriers, which can be transmitted on the uplink signal transmitter via the at least one transmitting antenna to the GRS 130. An amplifier 246 may be use to increase or boost the power of the uplink signals.

On a reception side of the GLT 140, the GLT can include at least one downlink receiving antenna 210, a downlink signal receiver 240, and a GRS ephemeris updater 242. The downlink signal receiver can be configured to receive the downlink signals from a GRS 130 (or other transmission station) via the at least one downlink receiving antenna. In an example, the uplink transmitting antenna 208 and the downlink receiving antenna 210 may be integrated into a single antenna unit. The GRS ephemeris updater can be used to determine and refine GRS ephemeris using the received downlink signals. When the first uplink signal and the second uplink signal are received, the GRS ephemeris updater can correct a Doppler shift due to ionospheric interference and delay or refraction in the downlink signals and compute a corrected Doppler shift of the downlink signals. Using the downlink signals (e.g., corrected Doppler shift of the downlink signals), the GRS ephemeris updater can compute a GLT-to-GRS range (e.g., GLT range) using the TOF of the downlink PRN signals. The GLT may have no clock bias since the originating signal (e.g., uplink signal) and the return signal (e.g., the downlink signal) use a same clock. In an example, the GRS ephemeris updater can update the precision of the GRS ephemeris using the corrected Doppler shift of the downlink signals and the GLT range. In another example, the GRS ephemeris updater can determine an ephemeris to better than a 1 meter (m) and 10 centimeter/second (cm/sec) resolution.

A second set of signals (e.g., the first uplink and downlink signals and the second uplink and downlink signals) can be transmitted by the GLT and received by the GLT to at least partially compensate for various factors and occurrences, such as atmospheric delays and refraction in the transmitted signals and in the transponded signals.

Atmospheric delays can include ionospheric delays and tropospheric delays. Ionospheric delay occurs in the ionosphere, which is a part of the upper atmosphere, comprising portions of the mesosphere, thermosphere and exosphere, distinguished because the upper atmosphere can be ionized by solar radiation. The ionosphere can play a part in atmospheric electricity and forms the inner edge of the magnetosphere and can influence radio propagation to distant places on the Earth. Tropospheric delay occurs in the troposphere, which includes the lowest portion of the Earth's atmosphere.

Refraction can be the change in direction of a wave due to a change in the index of refraction of the medium through which the signal passes. Although atmospheric refraction may not be measured, the second set of signals can be used to estimate for atmospheric refraction and account for the estimate in final range estimates. Atmospheric refraction can include the deviation of light or other electromagnetic wave, such as a RF signal, from a straight line as the light or other electromagnetic wave passes through the atmosphere. Refraction can occur due to the variation in air density as a function of altitude. Refraction can cause an extra path to be introduced into flight and can generate a small error in range measurements.

In essence, atmospheric delays and refraction can vary the TOF and the Doppler shift of signals, which variances can be accounted or compensated for by the second set of signals. The frequency carrier can be selected to minimize the atmospheric delays and refraction effects on the signal. For example, the atmospheric delays (e.g., ionospheric delays) can be a function of the inverse of the frequency squared. Using the relationship between the atmospheric delays and the frequency can enable correction of ionospheric delays using two or more carriers. For frequency carriers with a frequency band between 1-2 gigahertz (GHz), the effects due to ionospheric delays can be very small. For frequency carriers with a frequency band greater than 2 GHz, the effects due to ionospheric delays can be negligible. For frequency carriers with a frequency band less than 1 GHz, the effects due to ionospheric delays can be more significant. The ultra high frequency (UHF) band is the radio frequency range from 300 megahertz (MHz) to 3 GHz. A frequency carrier with a frequency band greater than the UHF band can minimize the effects of the ionospheric delays, so a single set of uplink and downlink signals may be used with high resolution.

The frequency carrier of the uplink and downlink signals can be selected to minimize and avoid jammed portions of the radio spectrum, reduce ionosphere interference or delays, improve the Doppler shift resolution, or reduce the power drain on the GRS due to transmitting the downlink signals. The uplink signals and the downlink signal can operate in a frequency band (e.g., a GRS frequency band) between a very high frequency (VHF) band to a K-under ($K_u$) band. The VHF band is the radio frequency range from 30 megahertz (MHz) to 300 MHz, and the $K_u$ band is the radio frequency range from 10.95 gigahertz (GHz) to 14.5 GHz or the band directly below the K-band. The K-band is the radio frequency range from 18 GHz to 27 GHz. The GRS frequency band can include the VHF, an ultra high frequency (UHF), and portions of a super high frequency (SHF) band, such as the $K_u$ band.

In another example when the GRS ephemeris information is not initially known (e.g., stored) on the GLT 140, the ephemeris or orbit of the GRS can be determined using various methods for determining the orbit of a satellite (e.g., GRS). In an example, the ephemeris information of the GRS can be obtained using the methods and systems described in U.S. patent application Ser. No. 13/463,522 filed May 3, 2012 May 2, 2012, entitled "Position and Elevation Acquisition for Orbit Determination" which is incorporated by reference in its entirety herein.

Referring back to FIG. 3, a GROUNDLINGS satellite (GRS) 130 can receive the uplink signals from the GLT 140. In an example, the GRS can include at least one uplink receiving antenna 206, an uplink signal receiver 230 for receiving the uplink signals, a frequency shifter or delay module 232 for generating the downlink signals from the uplink signals, at least one downlink transmitting antenna 204, and/or a downlink signal transmitter 236 for transmitting the downlink signals on selected frequency carriers to the GER 120. In an example, the downlink transmitting antenna 204 and the uplink receiving antenna 206 may be integrated into a single antenna unit. The downlink transmitting antenna or the uplink receiving antenna can be a wide angle antenna to cover the Earth from a low orbit. An amplifier 234 may be use to increase or boost the power of the downlink signals. In an example, the frequency shifter or delay module can provide a delay so both uplink transmissions and downlink transmissions can operate on a same frequency carrier without signal collisions when TDD is used. In another example, the frequency shifter or delay module can provide a frequency shifter to shift an uplink signal from the uplink frequency carrier to a different downlink frequency carrier when FDD is used. In another example, the GRS can include an ephemeris updater 238 which can extract the GRS ephemeris information and/or the GLT location (or other transmission station locations) from the uplink signal and store the information in a storage medium (e.g., a database). In another configuration, the GRS can augment the downlink signal with the GRS ephemeris information or the GLT location, which can be used to generate a range or super-range. In another configuration (not shown), the GRS can include a tone generator to generate a downlink tone signal from the GRS, which can be used to measure a Doppler shift.

The GROUNDLINGS end receiver (GER) 120 can include at least one downlink receiver antenna 202, a downlink signal receiver 220, a signal despreader 222, and a GROUNDLINGS module 260. The GER can determine a GER location based on a timing or TOF of the downlink PRN signal and a Doppler shift in the downlink signal (e.g., a downlink tone signal or a downlink PRN signal), which can be processed by one of the modules of the GER. The GROUNDLINGS module can generate a global 3-D position of the GER using the GLT location, the GRS ephemeris, a TOF super-range measurement, and a Doppler shift in downlink signals. The downlink signal receiver can detect the analog radio frequency (RF) downlink signals received. The signal despreader can demodulate, despread, and/or decode the downlink signals. The signal despreader can extract the time at a GLT and/or a GRS location based on GRS ephemeris from the downlink signal. In an example, the signal despreader can be used to determine the TOF (e.g., super-range measurement) of the combined uplink and downlink signal (with known processing delays at the GRS).

The GROUNDLINGS module 260 can include a Doppler shift module 262, a range estimator 266, and a receiver location estimator 268. In an example, the range estimator can compute a super-range from a timing or TOF of the PRN signal and estimate a range to the GRS using the GLT location and the GRS ephemeris. From the super-range and the estimated GLT-to-GRS range, the GRS-to-GER range can be estimated. The Doppler shift can generate a corrected shift of the downlink signal when at least two sets of downlink signals are used. The Doppler shift (e.g., corrected shift of the downlink signal) can be used obtain an initial bearing to the GER. The receiver location estimator can determine an initial position of the GER from a Doppler shift magnitude, a Doppler slope (e.g., or integrated Doppler measurement), the GRS-to-GER range, and the GRS position. The Doppler shift magnitude can provide a bearing of the GRS relative to the GER. In an example, the receiver location estimator can iterate (e.g., repeat measurements and estimation) the 3-D position of the GER using a GER linear model, the ranges, the Doppler shift, and Doppler measurements trended over time to generate additional precision in the GER location. In an example, the position and velocity of a GER can be displayed on an output device (not shown), such a display or screen. A comparison of the ranges derived from the super-range and the Doppler shift of the downlink signals can be used to reset GER clock bias.

In an example with a nearly stationary GER or a GER with a known velocity, the GER can compute a range and a bearing within 20 meters within one second. Initially, a range error can be dominated by clock bias, which can provide an initial resolution of 300 m or greater. Within 5 seconds of an initial Doppler measurement, the dominant errors can include range in bearing errors and clock error in range measurements. Multiple measurements including multiple angles can reduce error due to clock bias and can be used to track GER movement or motion.

A GER using a more accurate oscillator can have less clock error. The GER clock error can be substantial (e.g., 1 microsecond [μsec] can corresponds to a 300 meter error) and can adversely affect an estimated volume in which the GER is located. The estimated volume can be a long, thin cylinder whose long dimension is centered on the line between the GRS and GER. As the GRS moves rapidly across the sky, a series of "error cylinders" can be generated with a long axis of each error cylinder pointing towards the GRS. The GER can compute the intersections of the long cylinders to determine a 3-D position of the GER. Once a 3-D position of the GER is known, the GER can correct clock errors and update its position very precisely in 3-D coordinates. Alternatively, signals from two or more GRS may be received in parallel or sequentially to refine the position estimate and reduce and/or remove the effects of clock bias. A trend in the Doppler shift of the downlink signals combined with range measurements can be used to precisely determine the location of the GER (within a small circular error) at a known altitude or with a stable altitude. When a prior knowledge of the GER's altitude is not known, an altimeter can be used to provide an altitude of the GER. The altimeter can be used to initialize the altitude of the GER. The altimeter can be a pressure altimeter or a barometric altimeter, but other types of altimeters can also be used, such as a sonic altimeter or a RADAR (radio detection and ranging) altimeter. When altitude is not known, the GER may occupy a cylindrical region of uncertainty.

In another example, the receiver location estimator can include an altimeter, a barometer sensor, or an altitude sensor for determining an altitude of the GER. The receiver location estimator can include an inertial measurement unit (IMU), an inertial navigation system (INS), a motion sensor, a velocity sensor, an accelerometer, a magnetometer, a barometer, a rotation sensor, a gyroscope, a wheel counter, an odometer, or a pedometer for determining movement of the GER.

In another example, the GER 120 can include a GPS receiver (not shown) to provide a dual global positioning in an end receiver using GSP and GROUNDLINGS. The GPS receiver can include a GPS signal receiver and a GPS signal processor for obtaining a global positioning of the GER using standard GPS processing. The GER position determined by GPS can be compared to the GER position determined by the GROUNDLINGS module, which can be used to verify that the GPS has not been spoofed.

Figure 4:
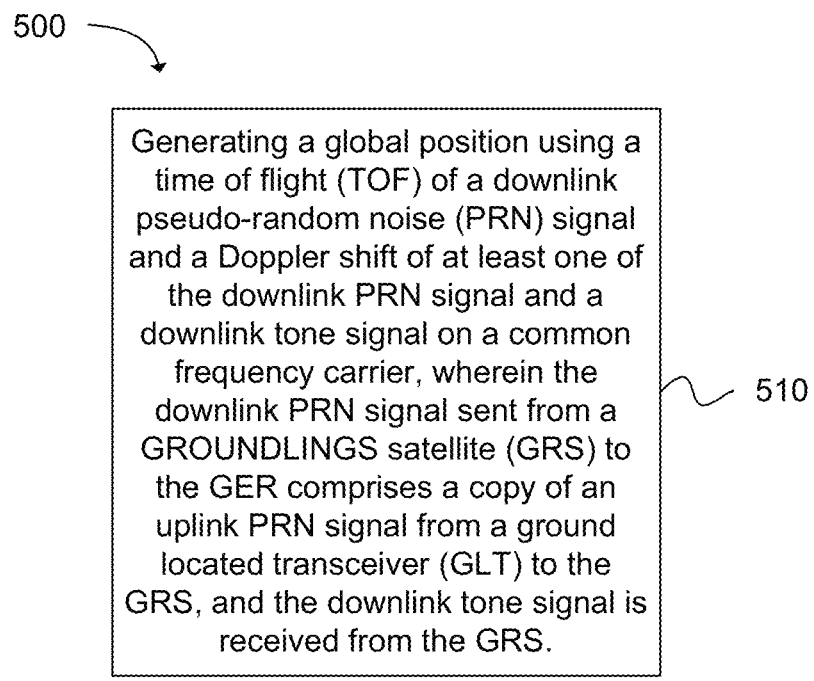
FIG. 4 depicts a flow chart of a method for global positioning using a ground location inertial navigation geopositioning system (GROUNDLINGS) end receiver (GER) receiving transmission originating from a ground located transceiver (GLT) in accordance with an example.

Another example provides a method 500 for global positioning using a ground location inertial navigation geopositioning system (GROUNDLINGS) end receiver (GER), as shown in the flow chart in FIG. 4. The method includes the operation of generating a global position using a time of flight (TOF) of a downlink pseudo-random noise (PRN) signal and a Doppler shift of at least one of the downlink PRN signal and a downlink tone signal on a common frequency carrier, wherein the downlink PRN signal sent from a GROUNDLINGS satellite (GRS) to the GER comprises a copy of an uplink PRN signal from a ground located transceiver (GLT) to the GRS, and the downlink tone signal is received from the GRS, as in block 510.

The operation of generating a GER position can include: extracting GRS ephemeris information and a GLT location from the downlink PRN signal; determining a GLT range from the GLT to the GRS using the ephemeris of the GRS and the location of the GLT; calculating a super-range measurement from a timing of the downlink PRN signal, wherein the super-range measurement represents a distance from the GLT to the GER via the GRS; measuring a Doppler shift of at least one of the downlink PRN signal and a downlink tone signal; and estimating a GER position using the ephemeris of the GRS, the GLT range, the super-range measurement, and the measured the Doppler shift in at least one of the downlink PRN signal and the downlink tone signal.

Figure 5:
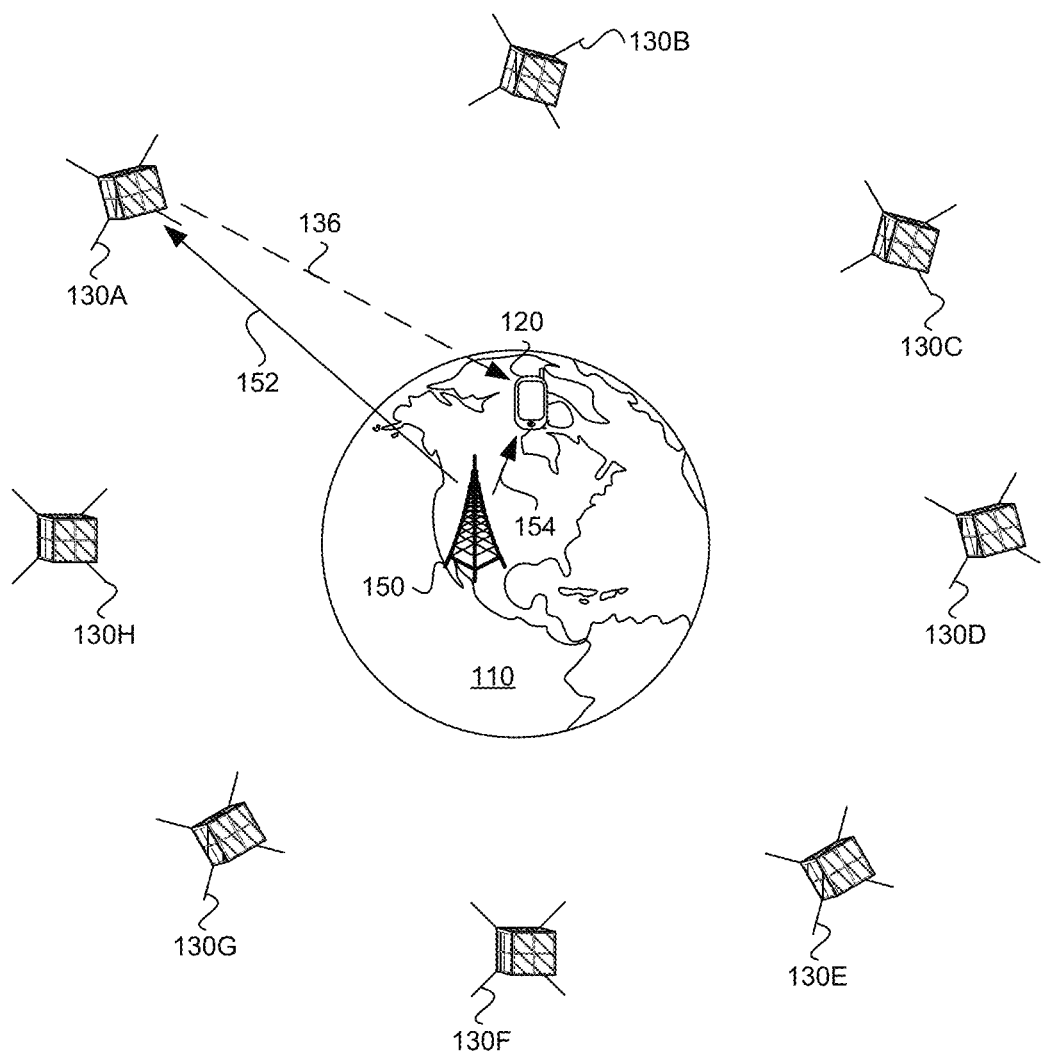
FIG. 5 illustrates a diagram of a known transmitter (KT), a plurality of ground location inertial navigation geopositioning system (GROUNDLINGS) satellites (GRS), and a GROUNDLINGS end receiver (GER) in accordance with an example.
Figure 6:
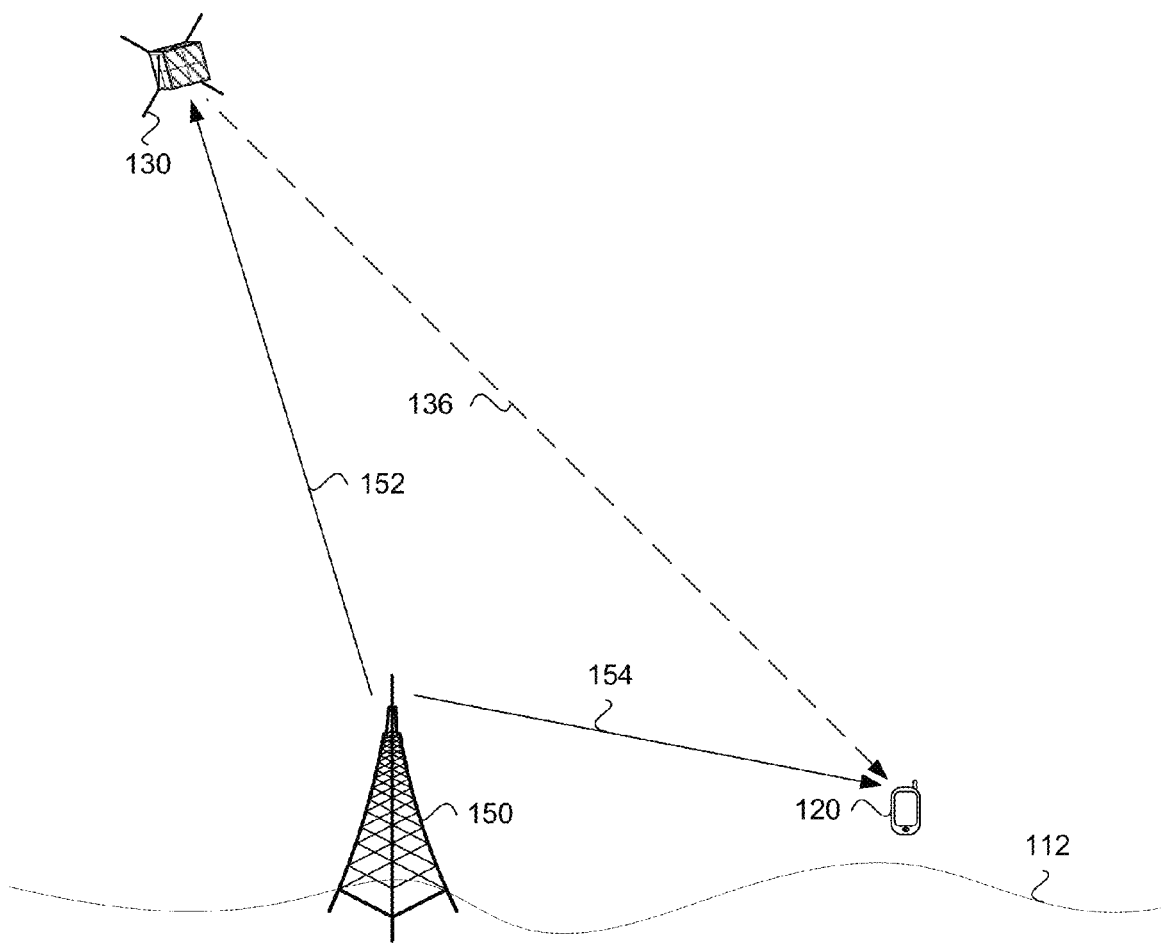
FIG. 6 illustrates a diagram of a known transmitter (KT), a ground location inertial navigation geopositioning system (GROUNDLINGS) satellite (GRS), and a GROUNDLINGS end receiver (GER) in accordance with an example.

FIGS. 5-6 illustrate another example of GROUNDLINGS adapted for a known transmitter (KT). The GROUNDLINGS can use other transmission stations (e.g., a KT with an existing broadcast signal to generate a global position of a GER. In an example, the GROUNDLINGS can include a known transmitter (KT) 150, a GROUNDLINGS satellite (GRS) 130A-H, and a GROUNDLINGS end receiver (GER) 120. In another example, the KT can be owned or operated by an entity not associated with the GRS or GER. The KT can transmit a broadcast signal (e.g., for another purpose such as television or radio station signal). The GRS can receive the broadcast signal in an uplink transmission 152 and copy the broadcast signal in a downlink transmission 136 to the GER. The GER can receive the original signal 154 from the KT and a copy of the broadcast signal relayed through the GRS.

Figure 7:
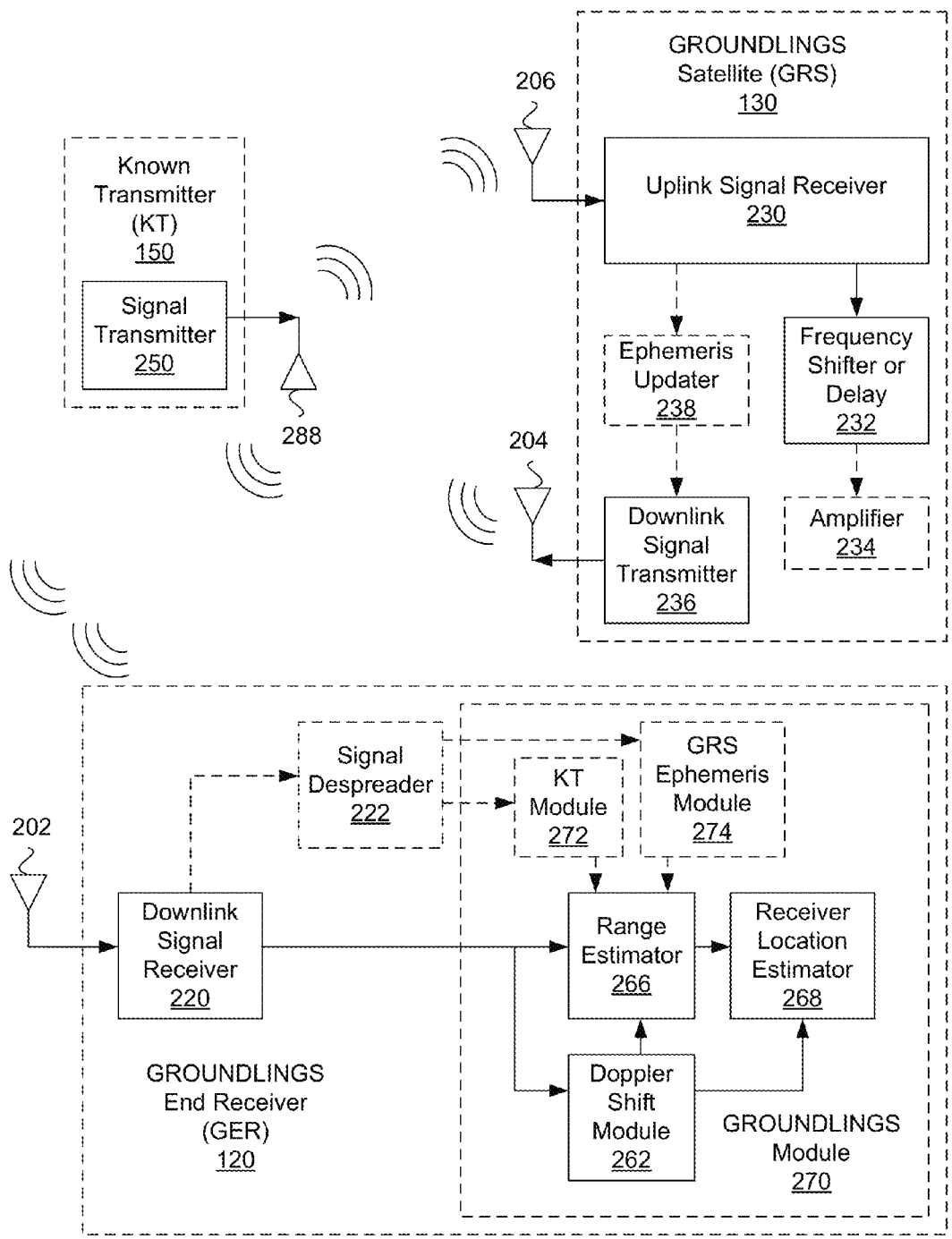
FIG. 7 illustrates a block diagram of a known transmitter (KT), a ground location inertial navigation geopositioning system (GROUNDLINGS) satellite (GRS), and a GROUNDLINGS end receiver (GER) in accordance with an example.

FIG. 7 can provide additional details of GROUNDLINGS adapted for the KT. In an example, the KT 150 can include signal transmitter 250 and an antenna 208 used to transmit an RF broadcast signal (e.g. a television or radio broadcast signal) with a known frequency carrier. The GRS can receive the broadcast signal via the uplink signal receiver on the known frequency carrier associated with the KT. The GRS can include modules and functionality similar to the modules and functionality described with FIG. 3. In an example, the GRS can include an ephemeris updater 238 which can store the GRS ephemeris information, at least one modulation frequency or frequency carrier transmitted by the KT, and/or the KT location (or other transmission station locations) in a storage medium (e.g., a database). The ephemeris updater may include an almanac of a plurality of GRS ephemerides in GROUNDLINGS. Since the broadcast signal may not include the KT location and/or the GRS ephemeris information (embedded in an uplink PRN signal), the GRS can augment a downlink signal with the GRS ephemeris information or the GLT location, which can be used by the GER to generate a KT-to-GRS range, a GRS-to-GER range, or super-range. In an example, the GRS ephemeris information or the GLT location can be included in a separate downlink PRN signal or the GRS ephemeris information or the GLT location can be included on the frequency carrier of used by the broadcast signal. In an example, the downlink frequency carrier can be a different frequency carrier used to carry the broadcast signal. In another example, the GRS can also communicate with a GLT periodically as previously discussed to update GRS ephemeris information, a KT location, and/or a modulation frequency or frequency carrier transmitted by the KT.

The GER 120 can include modules and functionality similar to the modules and functionality described with FIG. 3 including a GROUNDLINGS module 270. The signal despreader 222 can be used to extract information on the GRS ephemeris from the downlink signal. The GER can include a GROUNDLINGS module configured to generate a global position using a TOF of a broadcast signal from the KT and a TOF and a Doppler shift of a copy of the broadcast signal relayed through the GRS. The GROUNDLINGS module can include a Doppler shift module 262, a range estimator 266, and a receiver location estimator 268. In an example, the GROUNDLINGS module can also include a KT module 272 and/or a GRS ephemeris module 274. The KT module can be configured to store a KT location and/or at least one modulation frequency transmitted by the KT. The GRS ephemeris module configured to store ephemeris information from at least one GRS or the GRS ephemeris module can store an almanac of GRS ephemerides in GROUNDLINGS in a searchable storage medium (e.g., database). The KT module and/or the GRS ephemeris can be configured to periodically update or refresh information from a GRS signal, a ground station signal, or other space or terrestrial communication. A more frequent update of the GRS ephemeris information can improve accuracy of the GER location. In an example, the downlink signal can be transmitted by the GRS and can include a KT location, a modulation frequency transmitted by the KT, and/or GRS ephemeris information. In another example, the ground station signal can be transmitted by a ground station (e.g., the GLT or other transmission station) and can include a KT location, a modulation frequency transmitted by the KT, and/or GRS ephemeris information. In another example, the location of the KT can be entered by a user, stored in the GER, or provided by some other external source, such as the GRS. When the GRS ephemeris information is not transmitted by the GRS, the GER can obtain the GRS ephemeris information stored in the GRS ephemeris module.

In another example, when the KT location is not known, the range estimator may compare the TOF measurement of the original broadcast signal with the TOF measurement of the downlink signal representing a delayed copied of the broadcast signal. The comparison can be used to determine a delay, a range, or a KT location. The Doppler shift and trend of the Doppler shift of the downlink signal can be used by the GROUNDLINGS module to determine the location of the GER as previously discussed in relation to GROUNDLINGS adapted to the GLT. In GROUNDLINGS, the range values and Doppler shift values of the downlink signal can be unique to a GRS position, thus unique to a GER location.

Figure 8:
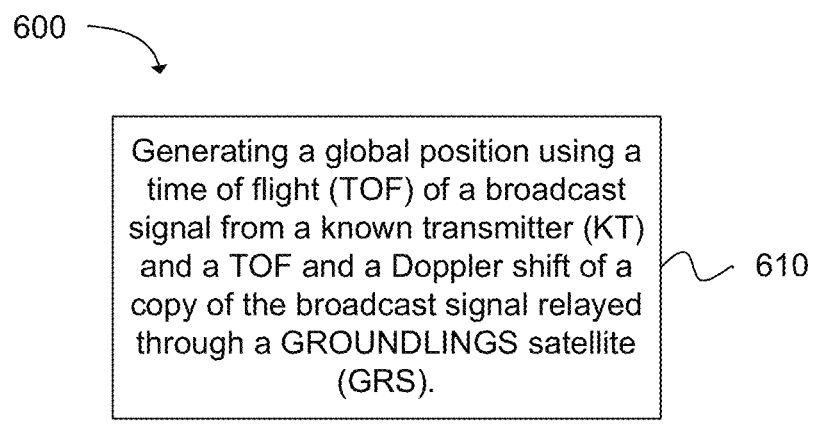
FIG. 8 depicts a flow chart of a method for global positioning using a ground location inertial navigation geopositioning system (GROUNDLINGS) end receiver (GER) in communication with a known transmitter (KT) in accordance with an example.

Another example provides a method 600 for global positioning using a ground location inertial navigation geopositioning system (GROUNDLINGS) end receiver (GER), as shown in the flow chart in FIG. 8. The method includes the operation of generating a global position using a time of flight (TOF) of a broadcast signal from a known transmitter (KT) and a TOF and a Doppler shift of a copy of the broadcast signal relayed through a GROUNDLINGS satellite (GRS), as in block 610.

The GROUNDLINGS can provide timely space-based positioning, navigation, and timing (PNT) backup or restoration to GPS capability in case GPS is completely or partially disabled. The GROUNDLINGS can provide PNT services in case of loss of GPS. In addition, the GROUNDLINGS can provide users of GPS (e.g., user with a GPS receiver and a GER or an integrated GPS and GROUNDLINGS end receiver) adequate position and/or navigation information when a GPS receiver is jammed, spoofed, or insufficient GPS satellites are in view of the end receiver. The GROUNDLINGS can also add precision to the existing GPS.

The positional accuracy of the GER can depend on a number of GRS in view, a time to process, a starting knowledge of the GER position, a gER velocity, and a GER acceleration. Once an initial GER position is established, a very fast convergence can occur to update the GER position. The GER position can be initialized with various options, such as user input, a handover from a last GPS position, signals from two or more GRS, or extended time measurements with one GRS. In many cases, downlink signals from a single GRS can provide enough information to locate the position of the GER.

Figure 9:
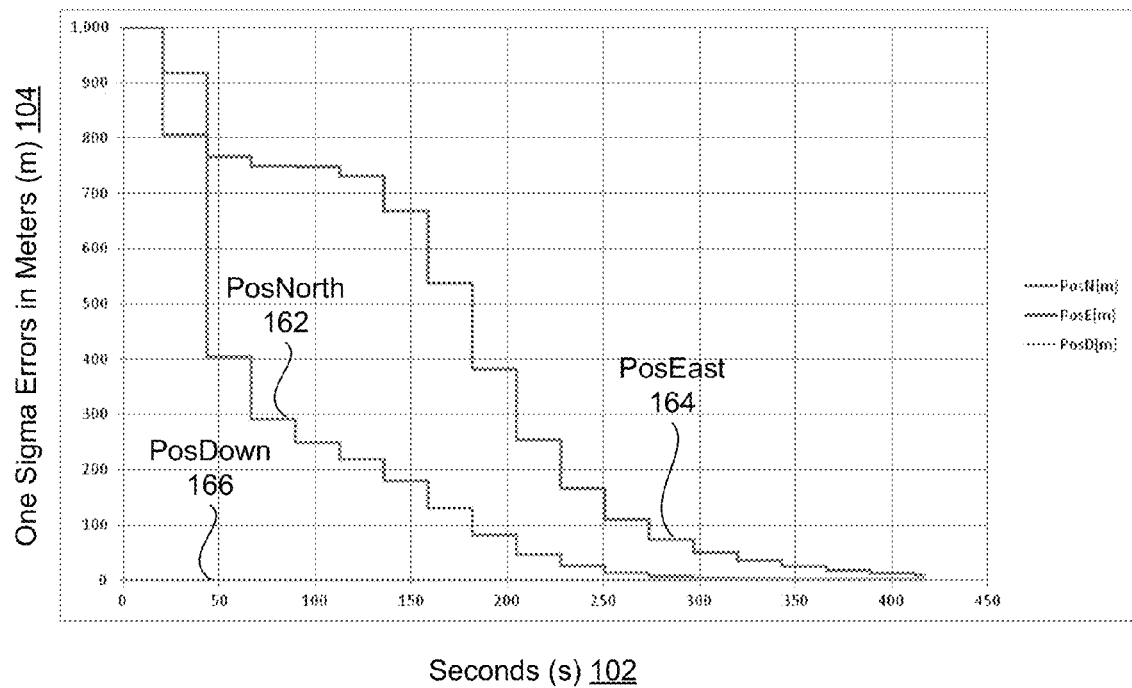
FIG. 9 illustrates a diagram of one sigma sample position error for the north, east, and down positions for a non-accelerating end receiver at a known altitude in accordance with an example.

FIG. 9 illustrates a positional accuracy estimate showing three-dimensional (3-D) one sigma position errors per axis for North, East, and down positions for a non-accelerating receiver and a known altitude using downlink signals from a single GRS at 1075 km polar orbit without initial position information. The position can be measured in meters 104 is determined over time (e.g., seconds 102). A vertical position, such as a down position (e.g., PosDown 166), can be constant since the altitude is known and constant in the example. In the example, a North-South position (e.g., PosNorth 162) (i.e., a horizontal position) can converge faster than an East-West position (e.g., PosEast 164) (i.e., a horizontal position). Unconstrained motion, such as an accelerating GER, can increase the time to converge on a position determination of the GER if the GER does not include sensor data or other information (e.g., additional GRS) to compensate for the unconstrained motion of the GER. Each constraint on motion such as motion at a known height, such as a ground vehicle, can reduce the time to converge on a position determination of the GER or reduce the number of GRS used to make the GER position determination. In an example, the covariance modeling of positional accuracy can show errors under 2.5 m for static receivers. The GER can provide high fidelity, especially for stationary and non-accelerating receivers.

Figure 10:
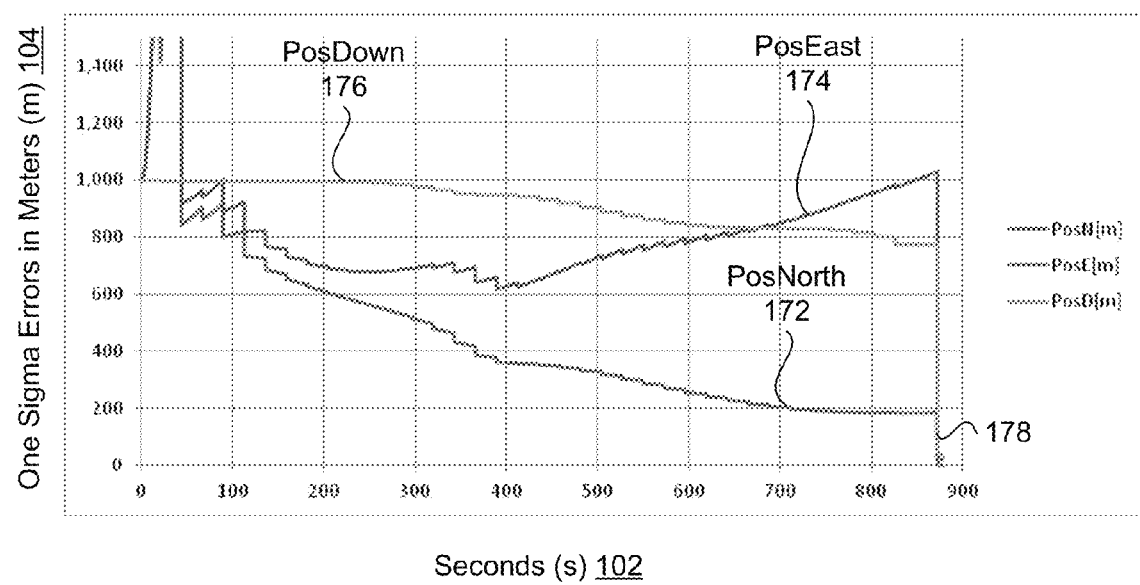
FIG. 10 illustrates a diagram of one sigma sample position error for the north, east, and down positions for a non-accelerating end receiver in accordance with an example.

FIG. 10 illustrates a positional accuracy estimate showing three-dimensional (3-D) one sigma position errors per axis for a North-South position (e.g., PosNorth 172), an East-West position (e.g., PosEast 174), and a down position (e.g., PosDown 176) for a non-accelerating receiver using downlink signals from a single GRS at 1075 km polar orbit without initial position information. The transition 178 of two GRS in view (e.g. a first GRS sets and a second GRS rises on the horizon) can be shown.

In an embodiment, the ground location inertial navigation geopositioning system (GROUNDLINGS) can restore and/or replace GPS-like capability without GPS satellites. The GROUNDLINGS can enable rapid 3-D determination of position for receivers in motion and at rest using signals from only one satellite (e.g., GRS). The GROUNDLINGS can provide a low cost augmentation to the GPS service. The GROUNDLINGS can use very small LEO satellites, including CUBESATs, for a large constellation. The GROUNDLINGS can have significant re-use of existing receiver hardware and techniques. The performance of GROUNDLINGS is scalable with size of the GRS satellites constellation. In an embodiment, most processing can be offloaded from the space segment of the GROUNDLINGS to the ground segment, where components can be cheaper and easier to maintain.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program (s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A ground location inertial navigation geopositioning system (GROUNDLINGS) end receiver (GER), comprising:
a GROUNDLINGS module configured to generate a GER position using a time of flight (TOP) of a downlink pseudo-random noise (PRN) signal and a Doppler shift of at least one of the downlink PRN signal and a downlink tone signal on a common frequency carrier, wherein the downlink PRN signal sent from a GROUNDLINGS satellite (GRS) to the GER comprises a copy of an uplink PRN signal from a ground located transceiver (GLT) to the GRS, and the downlink tone signal is received from the GRS,
wherein the GROUNDLINGS module further comprises:
a Doppler shift module configured to measure a Doppler shift in at least one of the downlink PRN signal and the downlink tone signal;
a range estimator configured to calculate a GLT range from the GLT to the GRS using GRS ephemeris information and a GLT location included in the downlink PRN signal and calculate a super-range measurement from a timing of the downlink PRN signal, wherein the super-range measurement represents a distance from the GLT to the GER via the GRS; and
a receiver location estimator configured to estimate a GER position using the ephemeris of the GRS, the GLT range, the super-range measurement, and the measured Doppler shift in at least one of the downlink PRN signal and the downlink tone signal.

2. The GER of claim 1, wherein the GROUNDLINGS module is further configured to generate the GER position using the TOF of the downlink PRN signal and the Doppler shift of the downlink tone signal.

3. The GERL of claim 1, wherein the receiver location estimator is further configured to determine an initial GER position from a GER range between the GRS and the GER and from a Doppler shift magnitude and a Doppler slope of at least one of the downlink PRN signal and the downlink tone signal.

4. The GER of claim 1, wherein the receiver location estimator is further configured to trend a range in a plurality of the downlink PRN signals and trends a Doppler shift in a plurality of the downlink PRN signals or downlink tone signals to generate the GER position.

5. The GER of claim 1, wherein the receiver location estimator further comprises at least one of an altimeter, a barometer sensor, and an altitude sensor for determining an altitude of the GER.

6. The GER of claim 1, wherein the receiver location estimator further comprises a sensor device selected from the group consisting of an inertial measurement unit (IMU), an inertial navigation system (INS), a motion sensor, a velocity sensor, an accelerometer, a magnetometer, a barometer, a rotation sensor, a gyroscope, a wheel counter, an odometer, a pedometer and combinations thereof for determining movement of the GER.

7. The GER of claim 1, wherein the GROUNDLINGS module is further configured to receive a second downlink PRN signal on a second frequency carrier and correct for ionospheric errors in the GER position using the downlink PRN signal and second downlink PRN signal.

8. The GER of claim 1, wherein the GROUNDLINGS module is further configured to decode the downlink PRN signal to generate a super-range measurement.

9. The GER of claim 1, wherein the GROUNDLINGS module is further configured to reset the clock bias by comparing the GLT range generated from the ephemeris of the GRS and the location of the GLT and the GLT range generated from the super-range or the Doppler shift in at least one of the downlink PRN signal and the downlink tone signal.

10. The GER of claim 1, further comprising:
a downlink signal receiver configured to receive at least one of the downlink PRN signal and the downlink tone signal;
a signal despreader configured to demodulate the downlink PRN signal, wherein the signal despreader is further configured for extracting at least one of a time at the GLT, a GLT location, and ephemeris information of a plurality of GRS.

11. A method for positioning using a ground location inertial navigation geopositioning system (GROUNDLINGS) end receiver (GER), comprising:
generating a position using a time of flight (TOP) of a downlink pseudo-random noise (PRN) signal and a Doppler shift of at least one of the downlink PRN signal and a downlink tone signal on a common frequency carrier, wherein the downlink PRN signal sent from a GROUNDLINGS satellite (GRS) to the GER comprises a copy of an uplink PRN signal from a ground located transceiver (GLT) to the GRS, and the downlink tone signal is received from the GRS, wherein generating the GER position further comprises:
extracting GRS ephemeris information and a GLT location from the downlink PRN signal;
determining a GLT range from the GLT to the GRS using the ephemeris of the GRS and the location of the GLT;
caculating a super-range measurement from a timing of the downlink PRN signal, wherein the super-range measurement represents a distance from the GLT to the GER via the GRS;
measuring a Doppler shift of at least one of the downlink PRN signal and a downlink tone signal; and
estimating a GER position using the ephemeris of the GRS, the GLT range, the super-range measurement, and the measured the Doppler shift in at least one of the downlink PRN signal and the downlink tone signal.

12. The method of claim 11, wherein the downlink PRN signal is a frequency shifted copy of the uplink PRN signal using a different frequency carrier from the common frequency carrier.

13. The method of claim 11, wherein the downlink PRN signal and the downlink tone signal are sequentially transmitted on the common frequency carrier.

14. The method of claim 11, wherein measuring the Doppler shift further comprises:
receiving a second downlink PRN signal or a second downlink tone signal on a second frequency carrier; and
correcting a Doppler shift for ionospheric errors using the downlink PRN signal and second downlink PRN signal or the downlink tone signal and second downlink tone signal.

15. The method of claim 11, wherein the common frequency carrier operate in a frequency band greater than an ultra high frequency (UHF) band.

16. The method of claim 11, wherein the GRS is selected from the group consisting of a CUBESAT, a low Earth orbit (LEO) satellite, and combinations thereof, wherein the CUBESAT weighs less than 5 kilograms.

17. A computer program product, comprising a non-transitory computer readable storage medium having a computer readable program code embodied therein, the computer readable program code adapted to be executed to implement the method of claim 11.

18. A ground location inertial navigation geopositioning system (GROUNDLINGS) end receiver (GER), comprising:
a GROUNDLINGS module configured to generate a global position using a time of flight (TOF) of a broadcast signal from a known transmitter (KT) and a TOF and a Doppler shift of a copy of the broadcast signal relayed through a GROUNDLINGS satellite (GRS), wherein the GROUNDLINGS module further comprises:
a Doppler shift module configured to measure a Doppler shift in the copy of the broadcast signal;
a range estimator configured to calculate a KT range from the KT to GRS using an ephemeris of the GRS and a location of the KT and calculate a super-range measurement from a timing of the copy of the broadcast signal, wherein the super-range measurement represents a distance from the KT to the GER via the GRS; and
a receiver location estimator configured to estimate a GER position using the ephemeris of the GRS, the KT range, the super-range measurement, a TOF the broadcast signal, and the measured the Doppler shift in the copy of the broadcast signal.

19. The GER of claim 18, wherein the GROUNDLINGS module further comprises:
a KT module configured to store a KT location and at least one modulation frequency transmitted by the KT; and
a GRS ephemeris module configured to store ephemeris information from at least one GRS.

20. The GER of claim 19, wherein the KT module and the GRS ephemeris are configured to update information from a GRS signal or a ground station signal including at least one of a KT location, a modulation frequency transmitted by the KT, and GRS ephemeris information, wherein the GRS signal is transmitted by the GRS and the ground station signal is transmitted by a ground station.

* * * * *